May 24, 1938.  E. Q. SMITH  2,118,800
MOUNTING OF MOLDINGS, ETC
Filed April 1, 1936

INVENTOR.
E. Quimby Smith
BY Barnes, Kisselle, Laughlin & Raisch
ATTORNEY.

Patented May 24, 1938

2,118,800

UNITED STATES PATENT OFFICE 2,118,800

MOUNTING OF MOLDINGS, ETC.

Emmet Quimby Smith, Detroit, Mich., assignor to United-Carr Fastener Corporation, Cambridge, Mass., a corporation of Massachusetts Application April 1, 1936, Serial No. 72,102

5 Claims. (Cl. 189—88)

This invention relates to the art of mounting an element, such as a molding, welt or beading to an underlying support. It aims to provide an improved arrangement which embodies improvements in the fastener structure, the structure of the molding or beading, and a combination provided by the structures of the fastener and molding or beading.

The invention is concerned particularly with automotive vehicles. The exterior of passenger cars is quite often finished and ornamented by elements in the nature of moldings or beadings, which very often are of a highly polished metal for decorative purposes. Chromium plating is used very much today for this purpose, although, of course, other finishes could be provided. Some concealed means is preferably used to mount these exterior finishing elements. In some instances heretofore, the underlying structure of the automobile was provided with apertures and fastening devices were threaded into the molding or beading on the inner side and then the fastener devices located in the apertures. This is not only inconvenient, but it is difficult to properly space the fasteners in a length of molding and to hold them there once located. Often in applying one fastener, the other projecting fastener or fasteners scratch the finished surface of the vehicle, which obviously is very objectionable. This invention provides a structure which overcomes these objections and further facilitates the ease and speed of mounting such an element.

Moreover, the invention is applicable to a beading on the inside of a passenger vehicle, and the invention is particularly advantageous for use with an all-steel body. Where the inside trim, that is to say the trimming material inside a vehicle, which is usually mohair, broadcloth or other cloth, or leather or imitation thereof, meets at a seam, the invention may be utilized to locate a beading or molding structure to hide the seam, and at the same time may hold, or at least aid in holding, the edges of the trim meeting at the seam.

To these ends the invention provides a fastener structure, and a plurality of such fasteners may be used with a given piece of molding or beading. These fasteners are so arranged as to be located in position in an aperture in the underlying support and they are so constructed as to be self-sustaining; that is to say, the fastener so located, independently of a molding or beading, will stay in place. The molding or beading is so constructed that a length thereof may be passed over these fasteners and securely held in position. Thus there is obtained an arrangement whereby the fastener itself is tightly positioned to the underlying support, and the molding or beading is then in turn held tightly positioned by the fasteners, and the presence of the molding or beading increases the tension with which the fasteners remain in place. In other words, the fastener alone effects a certain tension, and then when the molding is located an additional tension is provided which increases the tightness of the mounting, thus making for a non-rattling arrangement which will not come loose.

Figure 1:
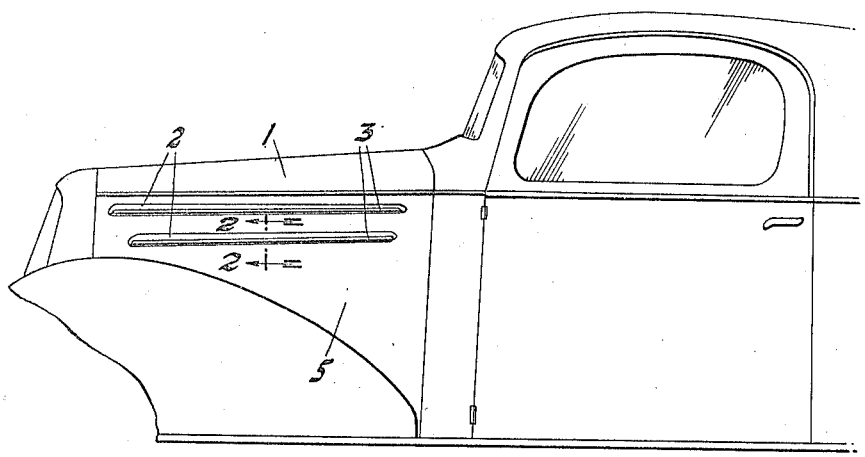
Fig. 1 is a partial view of any conventional automobile illustrating an ornamental bead on the outside thereof.

In Fig. 1 the hood of an automobile is illustrated at 1. This particular hood has a louver formation 2, and moldings of the type mentioned herein are fastened to the metal of the hood for ornamental purposes, the same being illustrated at 3. Now, Fig. 1 is used only to exemplify the invention, it being understood that the moldings may be otherwise located and of different designs. Some vehicles have moldings at the rear, have ornamental pieces in the nature of moldings on the fenders or the like, and the invention is applicable to any of such moldings.

Figure 2:
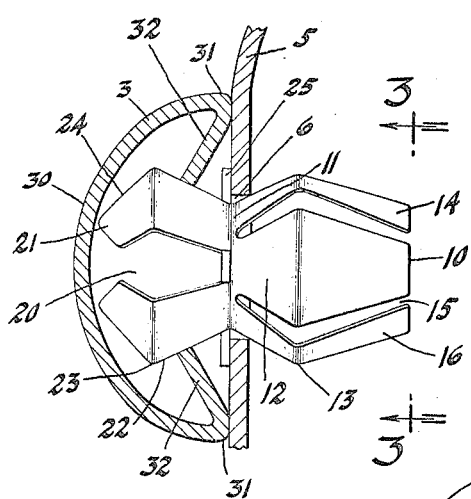
Fig. 2 is a cross sectional view of a fastener and beading.
Figure 3:
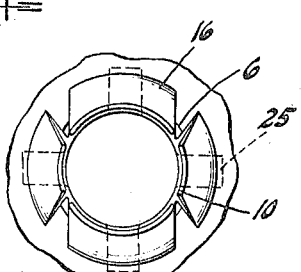
Fig. 3 is a view looking substantially on line 3—3 of Fig. 2.

In Fig. 2 the sheet metal panel of the outside surface of an automobile is shown at 5. This may be part of the hood, as shown in Fig. 1. It is provided with a suitable number of apertures 6. These apertures are spaced along the length of the molding to be mounted thereon and in any suitable number. The fastener is generally indicated at 10. This fastener advantageously is generally of tubular form as shown in Fig. 3. It may be made on what is known as an eyelet machine from sheet metal stock. The center portion of the fastener, as shown at 11, is restricted or of relatively small diameter. On one side of this central portion the metal flares outwardly as at 12 to an apex 13 and then the portions of the end of the fastener converge toward each other as at 14. This portion of the fastener is preferably divided into sections or fingers, to which end this portion of the fastener is provided with a suitable number of slots 15. As shown in Fig. 3 there are four of such sections or fingers and illustrated at 16. Accordingly, this portion of the fastener has an enlargement terminating in the apex 13, which, in effect, constitutes a resilient head.

The opposite end of the fastener is slotted as at 20, thus providing fingers or portions 21 which diverge outwardly from the restricted central part 11, as shown at 22, the extremity being indicated at the apex 23 from where the fingers converge toward each other as shown at 24; thus this end of the fastener in effect is provided with a resilient head structure.

Some of the metal which is obtained from the slots 20 is turned outwardly to form abutments 25. Where there are four slots there may, of course, be four abutments.

The location of these abutments is preferably definitely related to two other factors, to-wit: the inclined faces 12 and the thickness of the stock 5. This fastener may be located by merely pushing the fingers 14 through the apertures 6, bringing the abutments 25 against the support 5. At this time it is preferable that the fingers 14 remain slightly tensioned so that the fastener holds itself tightly in position. Even if the vehicle is used in this condition the fasteners remain tightly positioned and will not rattle.

The molding 2 comprises a strip of suitable material such as metal, preferably of concavo convex form in cross section, the body of which is illustrated at 30. Opposite edges are fashioned through an angle to provide contacting edges 31 for engagement with the support, and the extreme edges extend inwardly from the contact portions 31; that is to say, they extend into the concavity of the molding in an inclined manner, these extreme ends being shown at 32. These ends are designed to engage and be gripped by the outside head of the fastener as illustrated.

In making an assembly a suitable number of fasteners, or even one for that matter where one will suffice, is located in the support. These fasteners stay solidly in position. Now the molding is generally located as to its position, then snapped down over the outside heads of the several fasteners. This may be accomplished by pushing the molding over one fastener at a time or more than one at a time. The inside head of the fastener flexes when the same is passed through the aperture in the support and the fastener tightly grips the support. The outside head is flexed when the molding is passed thereover and the fingers 21 then flex outwardly. The engaging portions 31 of the molding lie tightly against and are held against the support by the action of the spring head. It will be noted that due to the presence of the molding there is a force on the fastener tending to pull it out of the support; that due to the abutments 25, even in the absence of the molding, there is a force tending to pull the fastener out of the support. Therefore, these two forces combine when the molding is present and both pull tightly on the fastener, and as a result the fingers 10 are held tensioned against the metal around the aperture 6 of the support. If for any reason, due to tolerance clearances or the like, the molding does not happen to grip tightly to one of a plurality of fasteners, this one fastener remains tight and will not rattle; if for some reason one particular fastener in itself is not tightened in the aperture the molding pulling on the fastener will make it tight. Thus these two factors combine with each other to secure a tight non-rattling connection, and if there is a defect in the action of one of these factors the other may hold the connection tight and non-rattling.

Figure 4:
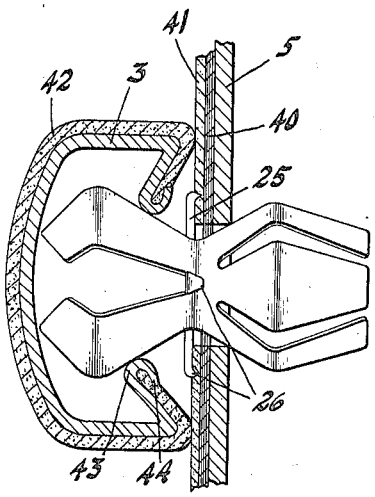
Fig. 4 is a cross sectional view similar to Fig. 3 illustrating that modified form useful for the interior trim of an automobile.

An arrangement for the trim of an automobile at a seam between trim material is shown in Fig. 4. The same fastener is used and it has the same reference characters applied thereto. Also the same reference characters are supplied to the support and the molding. Fig. 4 illustrates the interior structure of a vehicle. Over the metal support 5 lies the usual trim panel 40 and over this lies the inside trim 41 usually of a cloth such as mohair, broadcloth or the like, or in some cars real or imitation leather. In the structure visualized the trim material may meet in a seam substantially on the center line of the fastener. To cover this seam the fastener molding structure is utilized. In this form trim material 42 is placed over the molding and held thereto in a suitable manner. One way of doing this is to fashion the extreme ends of opposite edges of the molding material in a reverse bend 43, with the metal bent upon itself and clamping over the edges of the trim material as at 44. The molding may then be placed upon the fasteners and the trim material 42 may be of such type as to match or suitably contrast with the trim 41. In this structure the abutments 25 may be formed with a prong formation 26 to bite into and aid in holding the trim material.

This structure is especially desirable with the present all-steel body structure of passenger vehicles. When wood was used in the body, such molding, welt, or beading which covered seams could be tacked to the wood. However, with the use of an all-steel body tacks cannot be used, except where special provisions have been made to mount, in the body, suitable fibrous material for receiving the tack. This, of course, represents an additional difficulty in building the body and runs into some expense. With the present invention, no means of this nature need be provided, since the molding, beading or welt, or whatever it may be termed, may be snapped into position over the seam. In some vehicles there may be outside seams of this type, especially where the top or a portion thereof of the vehicle is of fabric, leather or the like, and of course, the structure may be used on the outside of the vehicle.

The invention has been shown and described in connection with the mounting of a long strip of material in the nature of a molding or beading; however, the article to be secured by the fasteners may not necessarily be technically a molding or beading, but may be of other shapes. It may simulate a spot or button, or a strip, plate or the like.

I claim:

1. A fastener structure substantially for the purpose described comprising, a one-piece spring metal body having a restricted intermediate portion, an enlarged compressible head on one side of the restricted portion adapted to be passed through an aperture in a support with the restricted portion positioned adjacent the aperture, another enlarged compressible head on the opposite side of the restricted portion adapted to hold means to be supported thereby, and abutments fashioned outwardly from a compressible head leaving slots therein for engaging the support on the side thereof opposite the first mentioned head.

2. A fastener structure substantially for the purpose described comprising, a one-piece tubular body member of spring metal having a restricted intermediate portion, a compressible head on one side of the restricted portion comprising, separated sections diverging outwardly from the restricted portion with the ends of the sections converging toward each other, said compressible head adapted to be passed through an aperture in a support, another compressible head on the opposite side of the restricted portion comprising separate sections diverging from the restricted portion and with the ends of the sections converging toward each other, and abutment means fashioned outwardly from between sections of a compressible head for engaging the support on a side thereof opposite the first mentioned head.

3. In combination with a sheet metal support having an aperture therein, trim material over the support and meeting at a seam adjacent the aperture, a fastener in the aperture, said fastener having a restricted portion adjacent the aperture and an enlarged compressible head on one side of the support, abutment means on the fastener lying against the trim material and having penetrating parts extending into the trim material for holding the same, a second compressible head on the opposite side of the restricted portion from the first compressible head, a molding of hollow form on its underside having inwardly extending parts, said molding positioned over the second compressible head with said parts engaging said head with tension so that opposite edges of the molding form are held against the trim material, and trim material over the outside of the molding.

4. In combination with an apertured support having trim material on one side thereof, a fastener in the aperture having an intermediate restricted portion and oppositely disposed in enlarged compressible heads, one on one side of the support and one on the other, said trim material meeting in a seam substantially at the aperture, means on the fastener for gripping the said trim material to aid in maintaining the seam, a molding of concave form on one side positioned over one head of the fastener, trim material over the molding, opposite edges of the molding form having inwardly extending parts for engaging the head of the fastener over which the molding lies, and means on said inwardly extending parts for gripping the trim material to hold the same on the molding.

5. In combination with a sheet metal support provided with an aperture, trim material on one side of the support meeting in a seam substantially at the aperture, a fastener positioned in the aperture, said fastener having an intermediate restricted portion adjacent the aperture and having an enlarged compressible head on one side of the restricted portion and support and a second compressible head on the opposite side of the restricted portion and support, abutment means on the fastener for engaging and gripping the trim material on the support to aid in holding the said trim material at the seam, the first mentioned compressible head holding the abutment means tightly to the trim material, a sheet metal molding positioned over the second head of the fastener, trim material over the molding, opposite edges of the metal of the molding extending inwardly from opposite edges of the molding form, the trim material likewise extending inwardly with said edges, the extreme edge portions of the metal being reversely bent and clamped upon the edges of the trim material, said extreme edges being in engagement with the second enlarged head of the fastener, whereby the opposite edges of the molding form are held against the trim material.

E. QUIMBY SMITH.